United States Patent
Kanda et al.

(10) Patent No.: US 7,315,393 B2
(45) Date of Patent: Jan. 1, 2008

(54) PRINTING SYSTEM, PRINTER DRIVER, AND PRINTING METHOD

(75) Inventors: Hidehiko Kanda, Kanagawa (JP); Jiro Moriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1092 days.

(21) Appl. No.: 10/411,298

(22) Filed: Apr. 11, 2003

(65) Prior Publication Data

US 2003/0193674 A1 Oct. 16, 2003

(30) Foreign Application Priority Data

Apr. 15, 2002 (JP) ............................. 2002-112660

(51) Int. Cl.
*B41B 15/00* (2006.01)
*B41J 29/393* (2006.01)

(52) U.S. Cl. ........................................ 358/1.18; 347/19
(58) Field of Classification Search ............... 358/1.18, 358/1.9, 1.16, 1.4; 347/19, 40, 15, 41, 84, 347/104, 10, 35

See application file for complete search history.

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |

(Continued)

FOREIGN PATENT DOCUMENTS

JP 54-56847 5/1979

(Continued)

OTHER PUBLICATIONS

U.S. Appl. No. 10/281,183, filed Oct. 28, 2002, Jiro Moriyama, Yuji Hamasaki, Yoshinori Nakagawa.

(Continued)

*Primary Examiner*—Thomas D Lee
*Assistant Examiner*—Saeid Ebrahimi
(74) *Attorney, Agent, or Firm*—Fitzpatrick, Cella, Harper & Scinto

(57) ABSTRACT

A printing apparatus performs printing by scanning a printhead having an array of printing elements in which a plurality of printing elements are arranged in a predetermined direction, over a printing medium according to control information and image data transmitted from a host apparatus. Setting information designating some of the printing elements to be used for printing in the printing elements in the printhead according to a predetermined printing parameter is transmitted as control information from the host apparatus to the printing apparatus in the printing apparatus, the printing elements to be used are set according to the setting information. Data to be printed by the printing elements used for printing in correspondence with scanning is generated in the host apparatus and transmitted as image data from the host. The printing apparatus performs printing by driving the set printing elements according to the image data during scanning. Control relating settings of printing parameters in the printing apparatus is thus simplified to effectively reduce the capacity of a memory and the number of gates of a logic circuit provided in the printing apparatus. The manufacturing cost and the size of the printing apparatus are thereby reduced.

15 Claims, 8 Drawing Sheets

U.S. PATENT DOCUMENTS

| | | | |
|---|---|---|---|
| 4,723,129 | A | 2/1988 | Endo et al. |
| 4,740,796 | A | 4/1988 | Endo et al. |
| 5,173,717 | A | 12/1992 | Kishida et al. |
| 5,971,518 | A | 10/1999 | Bolash et al. |
| 6,097,499 | A | 8/2000 | Casey et al. |
| 6,120,129 | A | 9/2000 | Iwasaki et al. |
| 6,128,098 | A | 10/2000 | Kamada et al. |
| 6,158,836 | A | 12/2000 | Iwasaki et al. |
| 6,264,305 | B1 | 7/2001 | Inui et al. |
| 2003/0122890 | A1 * | 7/2003 | Shimada et al. ............... 347/19 |

FOREIGN PATENT DOCUMENTS

| | | |
|---|---|---|
| JP | 58-146929 | 9/1983 |
| JP | 59-123670 | 7/1984 |
| JP | 59-138461 | 8/1984 |
| JP | 60-71260 | 4/1985 |
| JP | 08-132647 | 5/1996 |
| JP | 10-278318 | 10/1998 |
| JP | 11-227181 | 8/1999 |
| JP | 11-259248 | 9/1999 |

OTHER PUBLICATIONS

U.S. Appl. No. 10/411,111, filed Apr. 11, 2003, Jiro Moriyama, Hidehiko Kanda.

U.S. Appl. No. 10/411,189, filed Apr. 11, 2003, Jiro Moriyama, Hidehiko Kanda.

U.S. Appl. No. 10/411,527, filed Apr. 11, 2003, Jiro Moriyama, Hidehiko Kanda.

U.S. Appl. No. 10/413,144, filed Apr. 15, 2003, Toru Nakayama, Souhei Tanaka, Tetsushi Kono, Takeaki Nakano.

U.S. Appl. No. 10/413,146, filed Apr. 15, 2003, Souhei Tanaka, Akira Kuronuma, Toru Nakayama, Tetsushi Kono.

U.S. Appl. No. 10/413,485, filed Apr. 15, 2003, Akira Kuronuma, Souhei Tanaka, Hidehiko Kanda, Takeaki Nakano.

\* cited by examiner

PRINTING SYSTEM, PRINTER DRIVER, AND PRINTING METHOD

FIELD OF THE INVENTION

The present invention relates to a printing system, a printer driver and a printing method and, more particularly, to a printing system including a printing apparatus using a printhead having an array of printing elements in which a plurality of printing elements are arranged in a predetermined direction is scanned over a printing medium in a direction crossing to the predetermined direction to perform printing on the basis of information transmitted from a host. More specifically, the present invention relates to a printing system and a printing method which enable high-speed high-image-quality printing while reducing the manufacturing cost of a printing apparatus by reducing the capacity of a storage means (memory) provided in the printing apparatus.

BACKGROUND OF THE INVENTION

Various printing methods are presently being known for printing of information. Ink jet printing methods are being widely used for printing apparatuses, copying machines, etc., because they enable printing apparatuses, etc., to be easily designed which operate with a reduced noise level and are reduced in manufacturing cost, in running cost, and in size.

Serial ink jet printing apparatuses have been arranged to perform printing so far in such a manner that main scanning with a printhead and sub scanning by transporting a printing medium are alternately repeated to perform printing of one page. In such printing apparatuses, the printhead has printing elements including ejection openings (nozzles) and ejection energy generating elements for ejecting ink selectively from the nozzles.

In recent years, there has been a tendency to increase both the number of printheads and the number of ejection openings of one printhead to enable multicolor printing, to improve the image quality and the resolution and to increase the printing speed.

Ordinarily, a printing apparatus of the above-described kind is provided with a multiplicity of registers for a hardware setting as to whether or not each ejection opening is used for printing. Correspondingly, the number of gates of a control logic circuit in the form of an application-specific integrated circuit (ASIC) or the like is increased.

The capacity corresponding to an image to be printed by using all the ejection openings is required as the capacity of a memory (random-access memory (RAM)) for storing image data, while part of the ejection openings of the printing read are not used in some printing mode. In printing in such a printing mode, it is necessary to control drive of the rejection openings used in a mask or ASIC setting or the like. In such a case, to control operation as software the capacity of a read-only memory (ROM) is increased with the increase in program storage capacity.

Further, a printing apparatus is arranged so that a selection can be made from various printing modes and user settings for multiple functions. Control operations according to such settings are mainly performed in the printing apparatus. Therefore the number of gates of the logic circuit and the capacity of the ROM for such control operations tend to increase.

Thus, if control becomes complicated with the improvement in quality of printed images and the increase in the number of functions, the number of gates of the logic circuit and the capacity of the ROM are increased and an increase in manufacturing cost of the entire apparatus results.

SUMMARY OF THE INVENTION

An object of the present invention is to provide a printing system arranged to enable printing with high image quality while reducing the size and manufacturing cost of a printing apparatus by simplifying control on the printing apparatus side.

Another object of the present invention is to provide a printer driver arranged to enable printing with high image quality while reducing the size and manufacturing cost of a printing apparatus by simplifying control on the printing apparatus side.

Still another object of the present invention is to provide a printing method which enables printing with high image quality while reducing the size and manufacturing cost of a printing apparatus by simplifying control on the printing apparatus side.

To achieve the above-described objects, according to one aspect of the present invention, there is provided a printing system including a printing apparatus using a printhead having an array of printing elements in which a plurality of printing elements are arranged in a predetermined direction, the printing apparatus performing printing by scanning the printhead over a printing medium in a main scanning direction crossing to the predetermined direction, and a host apparatus connected to the printing apparatus, the host transmitting control information and image data, wherein the host transmits, as the control information, setting information designating some printing elements to be used for printing in the printing elements of the printhead according to a predetermined printing parameter, and transmits, as the image data, data to be printed by the printing elements to be used in the printing in correspondence with the scanning, and wherein the printing apparatus has setting means for setting the printing elements to be used according to the setting information, and performs printing by driving the printing elements set by the setting means according to the image data during the scanning.

According to another aspect of the present invention, there is provided a printer driver installed in a host apparatus connected to a printing apparatus using a printhead having an array of printing elements in which a plurality of printing elements are arranged in a predetermined direction, the printing apparatus performing printing by scanning the printhead over a printing medium in a main scanning direction crossing to the predetermined direction, the printer driver transmitting control information and image data to the printing apparatus, the printer driver having program codes for executing a setting information preparation step of preparing setting information designating, according to a predetermined printing parameter, printing elements to be used for printing in the printing elements of the printhead set by the printing apparatus, a control information transmission step of transmitting the setting information as the control information, an image data generation step of generating, as image data, data to be printed by the printing elements used for printing in correspondence with the scanning, and an image data transmission step of transmitting the image data.

According to still another aspect of the present invention, there is provided a printing method of performing printing by scanning a printhead having an array of printing elements in which a plurality of printing elements are arranged in a predetermined direction, over a printing medium in a direction crossing to the predetermined direction, the method including transmitting from the host setting information designating some printing elements to be used for printing in the printing elements of the printhead according to a predetermined printing parameter, the setting information being transmitted as the control information, setting the printing elements to be used according to the setting information, generating in the host data to be printed by the printing elements used for printing in correspondence with the scanning, and transmitting the data, the data being generated and transmitted as the image data, and performing printing by driving the printing elements set by the setting according to the image data during the scanning.

That is, according to the present invention, the printing apparatus performs printing on a printing medium according to control information and image data transmitted from the host apparatus by scanning a printhead having an array of printing elements in which a plurality of printing elements are arranged in a predetermined direction, over the printing medium in the direction crossing to the predetermined direction. Setting information designating some of the printing elements to be used for printing according to a predetermined printing parameter is transmitted as control information from the host to the printing apparatus. In the printing apparatus, the printing elements to be used are set according to the setting information. Data to be printed by the printing elements used for printing in correspondence with scanning is generated in the host and transmitted as image data from the host. The printing apparatus performs printing by driving the set printing elements according to the image data during scanning.

In this system, the printing apparatus may only set the printing elements to be used for printing according to the setting information received from the host without recognizing the kind of the set printing parameter, and perform printing by driving the printing elements according to the image data received from the host, during scanning, thus printing an image according to the set printing parameter.

Thus, control relating settings of printing parameters in the printing apparatus is simplified to effectively reduce the capacity of a memory and the number of gates of a logic circuit provided in the printing apparatus. The manufacturing cost and the size of the printing apparatus are thereby reduced.

Preferably, the host apparatus transmits the setting information each time it transmits a predetermined amount of the image data.

In this case, the predetermined amount may be selected in correspondence with one of one scanning pass, a plurality of scanning pass, one page on the printing medium, and one job.

The printing parameter may be one of the number of scanning passes on each of printing areas, the direction of said scanning, the kind of the printing medium, the size of the printing medium, the printing resolution, and the amount of data per pixel.

The printing apparatus may set a unit group of a certain number of printing elements as the printing elements to be used, and the host apparatus may generate the image data by adding null data in correspondence with some printing element not used for printing in the printing elements set in the printing apparatus.

In this case, the certain number may be a power of 2.

The setting information may include area designation information enabling a plurality of consecutive printing elements to be identified as the printing elements to be used for printing.

The printhead may have a plurality of arrays of printing elements, and the setting information includes information designating one of the arrays of printing elements to be used for printing.

The printing apparatus may have a plurality of printheads for enabling color printing using a plurality of printing agents, and the host apparatus transmits the setting information and the image data to each of the printheads.

Preferably, the printhead is an ink jet printhead which ejects ink to perform printing.

In this case, the printhead may be a printhead which ejects ink by using thermal energy, and which has thermal energy conversion element for generating thermal energy to be applied to ink.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Printing media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

First Embodiment

Figure 1:
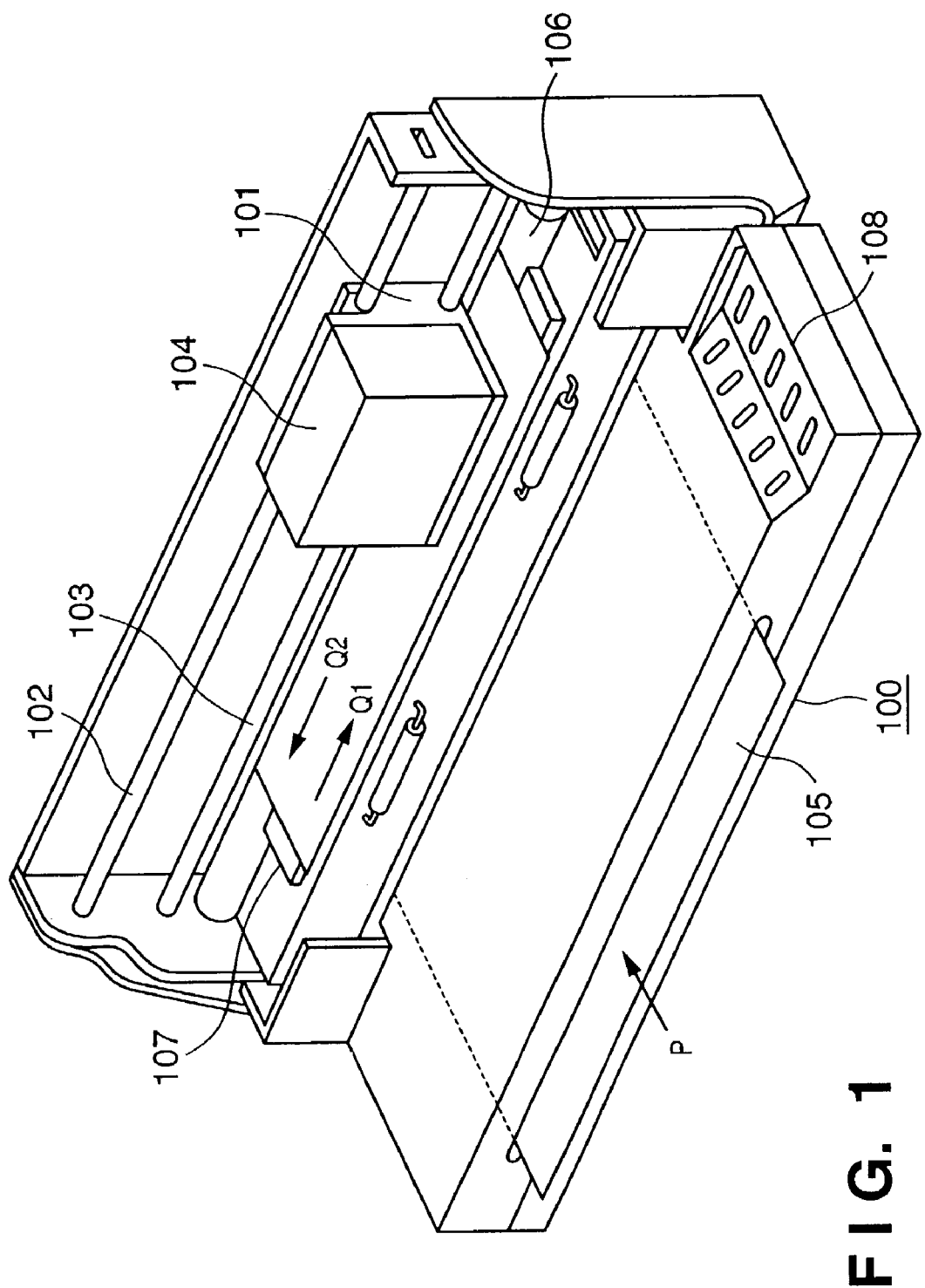
FIG. 1 is a schematic perspective view of an ink jet printing apparatus in a first embodiment of the present invention.

FIG. 1 is a schematic perspective view of an ink jet printing apparatus in a printing system representing a first embodiment of the present invention.

A printing medium 105 inserted into the sheet feed position of a printing apparatus 100 is fed by a feed roller 106 in a direction indicated by an arrow P, and conveyed to the printable region of a printhead 104. A platen 107 is arranged below the printing medium 105 in the printable region. A carriage 101 can be moved by two guide shafts 102 and 103 along them. The carriage 101 is reciprocally scanned by driving of a stepping motor (not shown) within a scanning region including a printing region in directions indicated by arrows Q1 and Q2 serving as a main scanning direction. After one main scanning ends, the printing medium is fed by a predetermined amount in the sub-scanning direction indicated by the arrow P, and waits for the next main scanning. Main scanning and sub-scanning are repeated to perform printing operation of one page. As for a printing width in the main scanning direction, a region where the printhead can be mechanically scanned is determined by the apparatus design. The maximum printing width is determined depending on the apparatus in correspondence with the scanning region. Printing can be done for a printing medium having a printing width determined by the scanning region of the printhead or a printing medium having a smaller printing width in the printing apparatus.

In FIG. 1, the printhead 104 mounted on the carriage 101 includes orifices (ejection openings) capable of discharging ink, and an ink tank which contains ink. The printhead is mounted on the carriage such that printing is done by discharging ink from the openings of the printhead to the printing medium below it. Reference numeral 108 denotes switches and a display unit. The switches are used to power on/off the printing apparatus or set various printing modes. The display can display various statuses of the printing apparatus.

Figure 2:
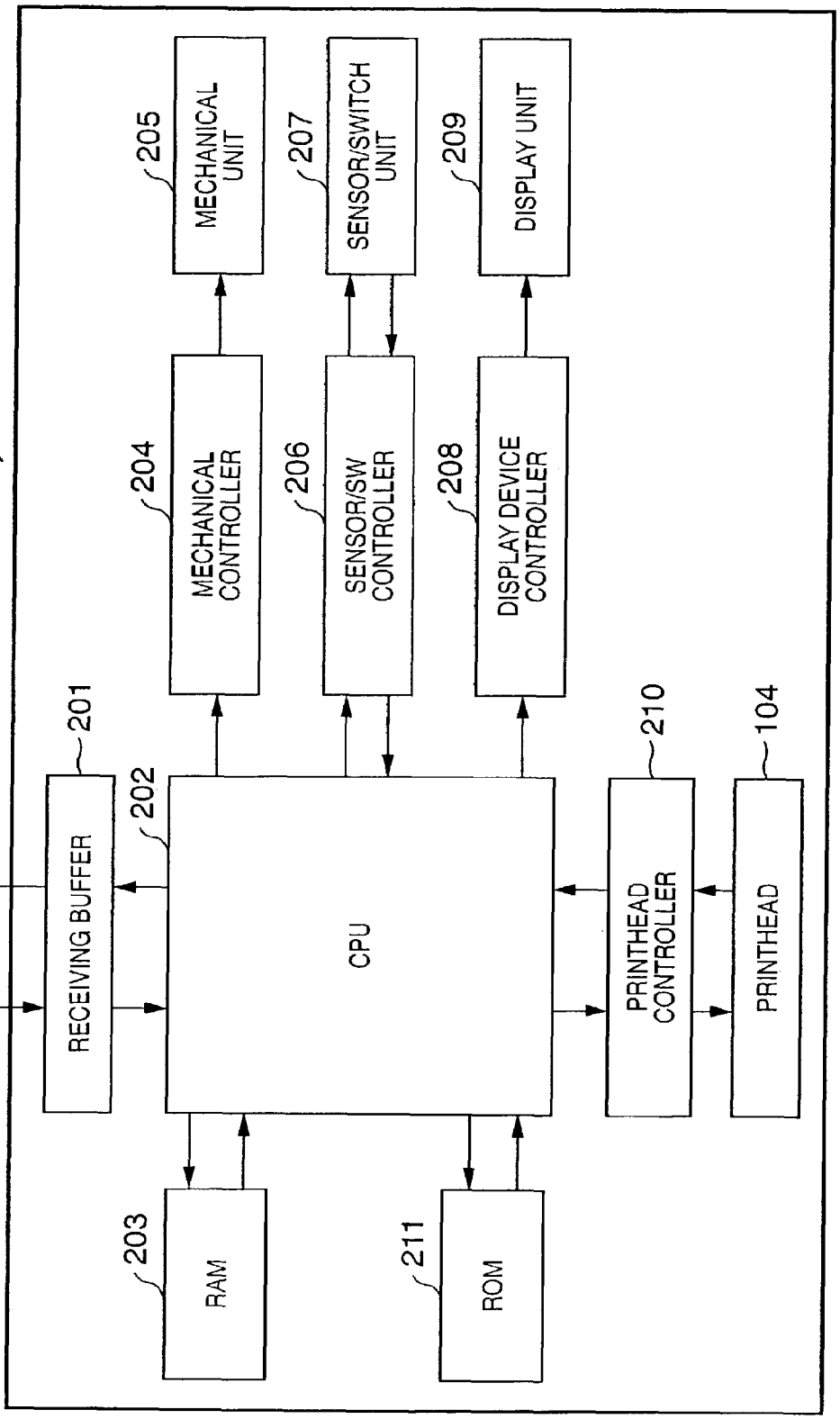
FIG. 2 is a block diagram showing an essential control configuration in a printing system in the first embodiment.

FIG. 2 is a block diagram showing the main control arrangement of the printing system according to the first embodiment. A host apparatus 200 is connected to the printing apparatus 100. Character data and image data to be printed are transmitted from the host apparatus 200 to the printing apparatus 100, and accumulated in a reception buffer 201. Data for verifying whether print data is correctly transferred, and data representing the operation status of the printing apparatus 100 are transmitted from the printing apparatus 100 to the host apparatus 200.

Data accumulated in the reception buffer 201 is processed into data for printing in main scanning of the printhead 104 under the management of a CPU 202 which operates in accordance with a control program stored in a ROM 211. The resultant data is stored in a print buffer within a random access memory (RAM) 203. The print buffer stores data used for printing by the printhead. Data stored in the print buffer is transferred to the printhead, and then printing is executed. In the example shown in FIG. 2, an area for the print buffer is ensured in the memory area of the RAM 203. Data in the print buffer is transferred to the printhead 104 by a printhead controller 210. The printhead is controlled to print character data or image data. The printhead controller 210 detects temperature information or the like representing the state of the printhead 104, and sends the information to the CPU 202. The information is transmitted to the printhead controller 210 which controls driving of the printhead.

A mechanical controller 204 drives and controls a mechanical unit 205 such as a carriage motor or line feed motor in response to an instruction from the CPU 202.

A sensor/SW controller 206 transmits a signal to the CPU 202 from a sensor/SW 207 including various sensors and SW (switch).

A display device controller 208 controls a display unit 209 comprised of LEDs, liquid crystal display devices, and the like for display panels in response to an instruction from the CPU 202.

In the printing system of this embodiment, a printer driver installed for the printer 100 generates image data when an instruction to perform printing is provided to the printer driver from an application in operation in the host 200 shown in FIG. 2. The printing apparatus 100 prints an image on a printing medium on the basis of image data and control data transmitted from the host 200.

Figure 3:
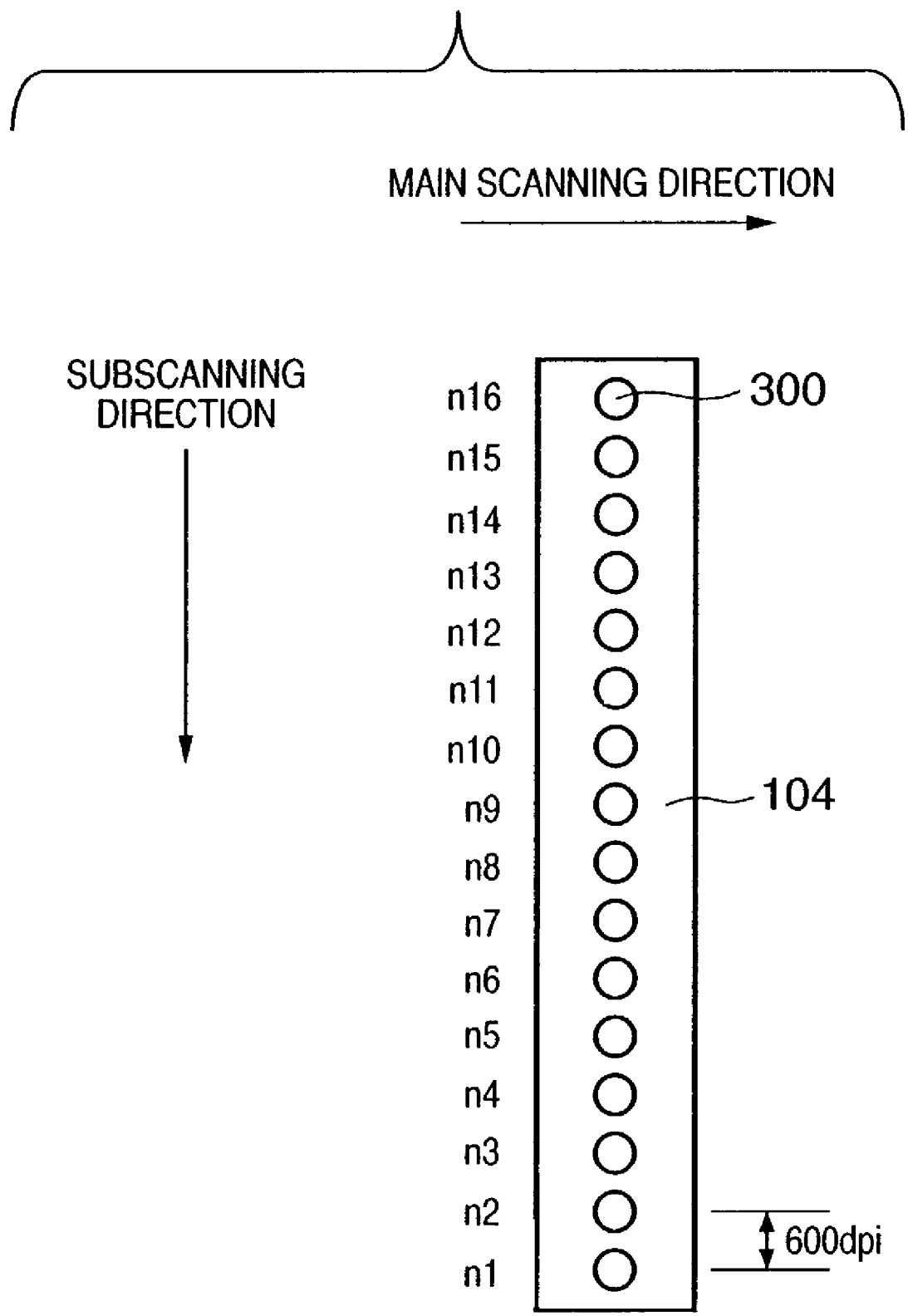
FIG. 3 is a diagram schematically showing the arrangement of nozzles in a printhead in the first embodiment.

FIG. 3 is a diagram showing an array of ejection openings of the printhead 104 of the ink jet printing apparatus 100 in this embodiment.

The printhead 104 shown in FIG. 3 is a printhead for ejecting black ink and has n=16 number of ejection openings (sixteen nozzles) 300 arranged at 600 dpi (a density of 600 openings per inch) in the subscanning direction. The printhead is driven at a drive frequency of 15 kHz and is capable of printing at a density of 600 dpi in the main scanning direction. Accordingly, the main scanning speed of the carriage in printing operation is 25 inches/sec.

Figure 4:
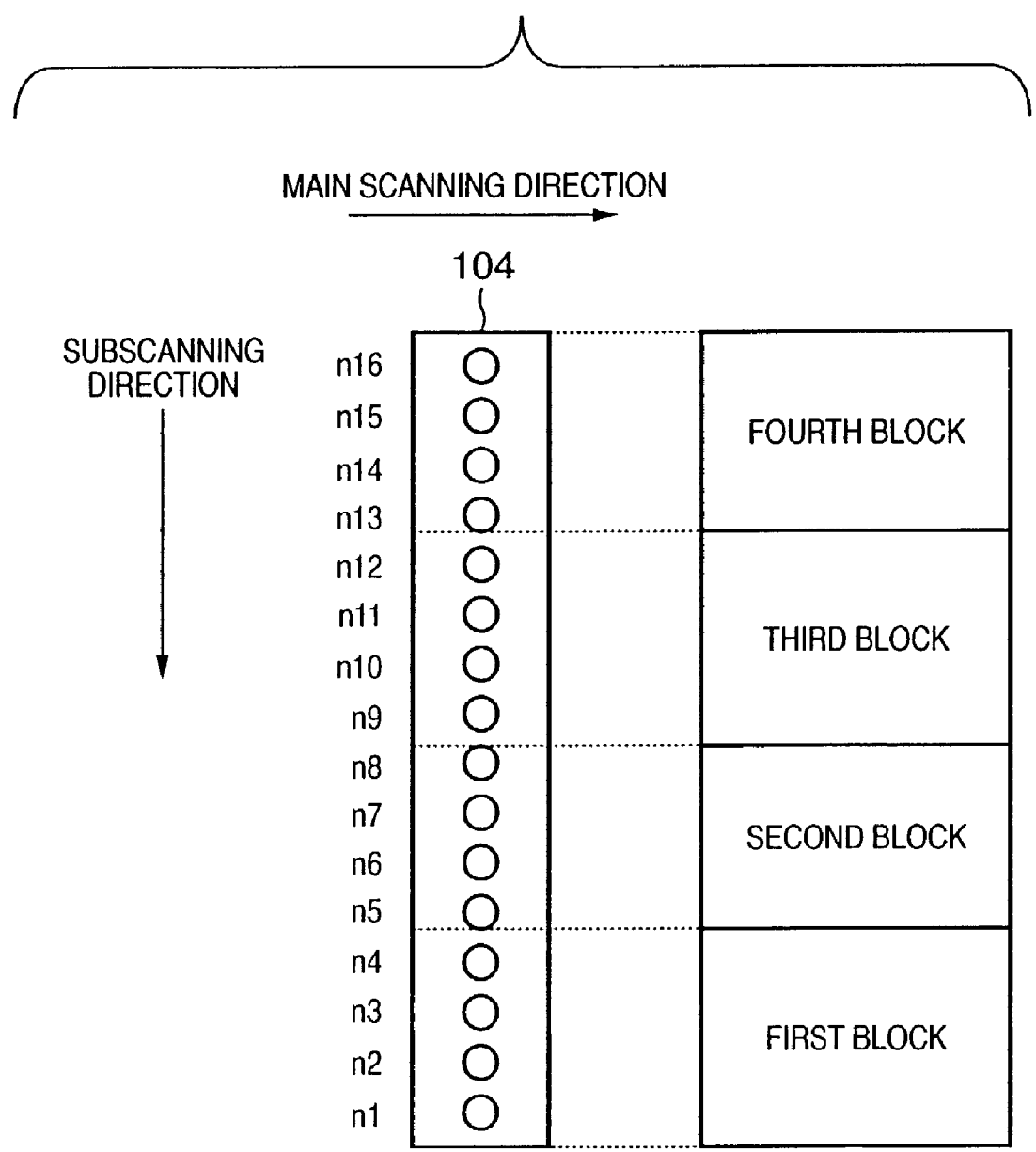
FIG. 4 is a diagram for explaining setting of ejection openings to be used in the first embodiment.

FIG. 4 is a diagram for explaining a setting of groups of ejection openings to be used in the printhead of the printing apparatus. In this embodiment, the printhead ejection openings to be used can be set on a block-by-block basis, as shown in FIG. 4. One block is formed by four nozzles. Four nozzles n1 to n4 can be set as a first block, four nozzles n5 to n8 as a second block, four nozzles n9 to n12 as a third block, and four nozzles n13 to n16 as a fourth block.

According to this setting of the groups of printhead ejection openings to be used, image data to be printed by scanning in one pass in the main scanning direction is transmitted from the printer driver in the host. The printing apparatus stores the received image data in an area held as a printing buffer in the RAM 203. From image data-stored in the printing buffer, a rectangular image is formed which has a height in the subscanning direction corresponding to the number of ejection openings used and a length in the main scanning direction corresponding to the printing width of the printing medium.

The printing apparatus in this embodiment has a 1-pass mode and a 6-pass mode as printing modes. The 1-pass mode is a printing mode in which an image is printed by main scanning in one pass using sixteen nozzles, and in which the printing medium is transported by 16/600 inch after each main scanning pass. The 6-pass mode is a printing mode in which an image is printed by using two nozzles through six passes for completion of printing in each printing area, and in which the printing medium is transported by 2/600 inch after each main scanning pass.

The printing mode is set by a user through a user interface such as a driver setting window of the printer driver for the printing apparatus 100 installed in the host 200.

Figure 5:
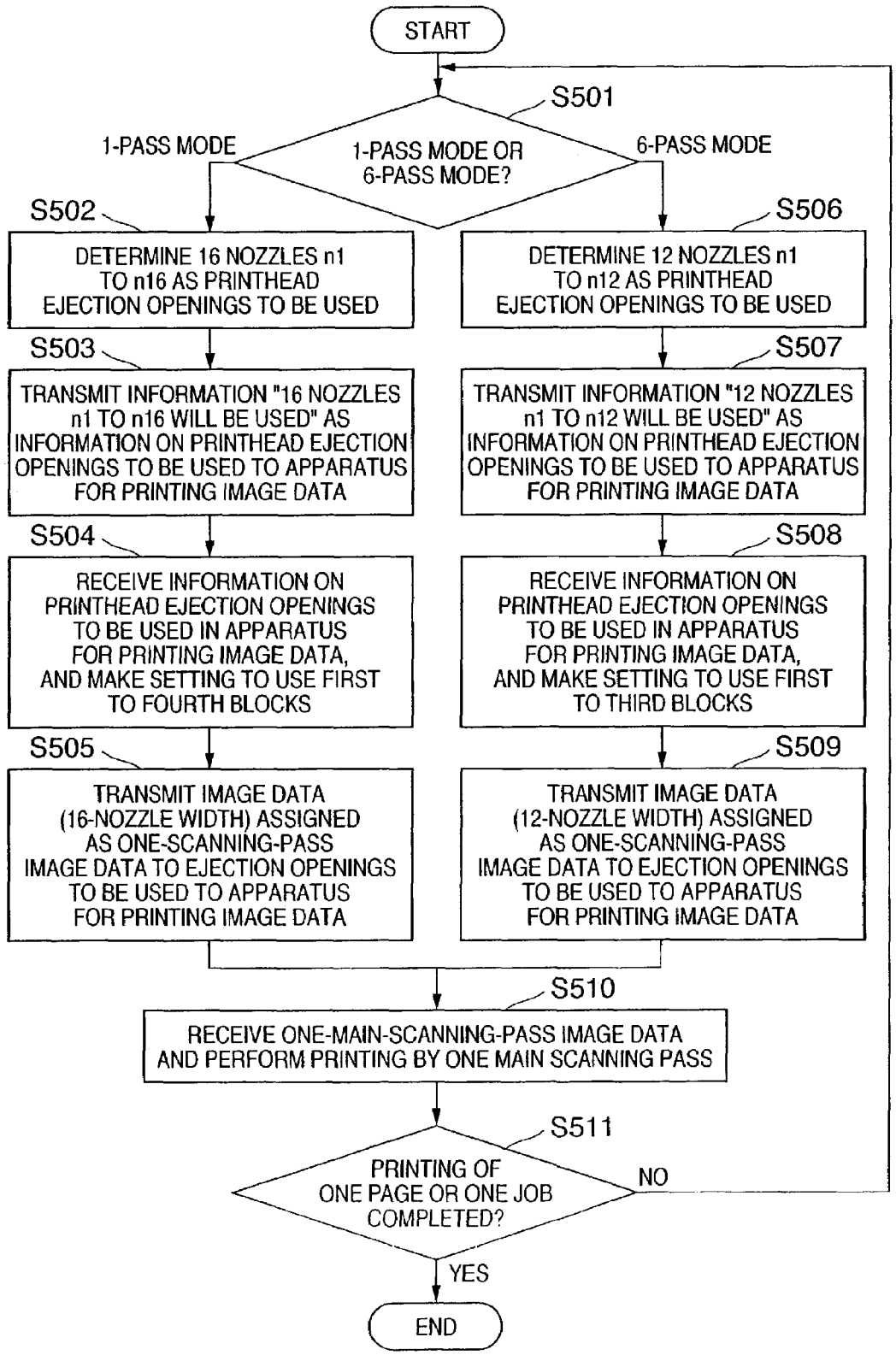
FIG. 5 is a flowchart showing processing for printing of one page or one job in the printing system of the first embodiment.

Processing for printing of one page or one job in the printing system of this embodiment will be described with reference to the flowchart of FIG. 5.

In the host 200, the printer driver determines which one of the 1-pass mode and the 6-pass mode is set (step S501). If the printer driver in the host 200 determines that 1-pass mode is set, it makes a decision to use the sixteen nozzles n1 to n16 as the printhead ejection openings to be used (step S502).

On the basis of the printhead ejection openings to be used determined in step S502, the printer driver in the host 200 transmits to the printing apparatus 100 control data as information on the ejection openings to be used indicating that "the sixteen nozzles n1 to n16 will be used" (step S503). The printing apparatus 100 receives this control data and makes a setting to use the sixteen nozzles n1 to n16 in the first to fourth blocks shown in FIG. 4 (step S504).

The printer driver in the host 200 transmits to the printing apparatus 100 image data of a size: (16 nozzles)×(the printing width of the printing medium) corresponding to the number of printhead ejection openings to be used, as image data to be printed by one main scanning pass (step S505). The printing apparatus 100 receives the image data transmitted to be printed by one main scanning pass, stores this data in the printing buffer, and performs printing by one main scanning pass using the printhead ejection openings to be used according to the setting (step S510).

The printing apparatus 100 has already set in step S504 the nozzles to be used for printing. That is, the size in the subscanning direction necessary for storage of the image data in the printing buffer has been determined and addressing at the time of write or read to or from the buffer can therefore be performed with efficiency.

The printer driver in the host 200 determines whether printing of the whole of one page or one job has been completed (step S511). If printing of the page or job has been completed, the printer driver transmits control data signifying the completion of printing to the printing apparatus 100, and stops printing. If printing has not been completed, the printer driver transports the printing medium by $14/600$ inch, the process then returns to step S501, and the printer driver again determines whether the present printing mode is the 1-pass mode or the 6-pass mode.

If the printer driver in the host 200 determines that the 6-pass mode is set in the determination of the printing mode in step S501, it makes a decision to use the twelve nozzles n1 to n12 as the printhead ejection openings to be used (step S506).

On the basis of the printhead ejection openings to be used determined in step S506, the printer driver in the host 200 transmits to the printing apparatus 100 control data as information on the ejection openings to be used indicating that "the twelve nozzles n1 to n12 will be used" (step S507). The printing apparatus 100 receives this control data and makes a setting to use the twelve nozzles n1 to n12 in the first to third blocks shown in FIG. 4 (step S508).

The printer driver in the host 200 transmits to the printing apparatus 100 image data of a size: (12 nozzles)×(the printing width of the printing medium) corresponding to the number of printhead ejection openings to be used, as image data to be printed by one main scanning pass (step S509). The printing apparatus 100 receives the image data transmitted to be printed by one main scanning pass, stores this data in the printing buffer, and performs printing by one main scanning pass using the printhead ejection openings to be used according to the setting (step S510).

The printer driver in the host 200 determines whether printing of the whole of one page or one job has been completed (step S511). If printing of the page or job has been completed, the printer driver transmits control data signifying the completion of printing to the printing apparatus 100, and stops printing. If printing has not been completed, the printer driver transports the printing medium by $2/600$ inch, the process then returns to step S501, and the printer driver again determines whether the present printing mode is the 1-pass mode or the 6-pass mode.

In this embodiment, as described above, the number of ejection openings of the printhead to be used in one main scanning pass is determined in the host according to the printing mode, and the information on the number of ejection openings to be used and image data to be printed by one main scanning pass according to the number of ejection openings to be used are transmitted to the printing apparatus. The printing apparatus may only set the ejection openings to be used according to the received information on the number of ejection openings to be used, without recognizing the printing mode, and thereafter print received image data, thus, forming an image according to the set printing mode.

It is, therefore, possible to simplify the control according to the printing mode and setting on the printing apparatus side to effectively reduce the capacity for a program to be stored in the ROM. As a result, the capacity of the ROM provided in the printing apparatus can be effectively reduced to achieve a reduction in the manufacturing cost of the printing apparatus.

Since not one but four of the ejection openings of the printhead to be used are set as a unit in the printing apparatus, the number of gates of the logic circuit, e.g., an ASIC can also be reduced effectively.

Processing performed in this embodiment necessitates an increase in the load on the printer driver in the host and an increase in the capacity for the printer driver program. In recent years, however, the processing speed of computers ordinarily used as the above-described host and the capacity of storage devices (semiconductor memories and hard disks) used for the computers have been remarkably improved. Therefore there is no problem with the above-mentioned increases in load and program capacity.

Second Embodiment

A second embodiment of the present invention will be described. The printing system of the second embodiment is similar to that of the first embodiment described above. This embodiment will be described mainly with respect to its characteristic portions but the description for portions identical or corresponding to those in the first embodiment will not be repeated.

In the first embodiment, the method in which the ejection openings of the printhead to be used are set the host (printer driver) and the method in which the ejection openings of the printhead to be used are set in the printing apparatus are the same. In the second embodiment, the method in which the ejection openings to be used are in the host and the method in which the ejection openings to be used are set in the printing apparatus are different from each other.

The printing apparatus in the second embodiment and the printing apparatus in the first embodiment have common features in that the number of nozzles of the printhead is sixteen and the printing apparatus has two printing modes: 1-pass and 6-pass modes. The printing apparatus in the second embodiment differs from the printing apparatus in the first embodiment in that the nozzles used in the 1-pass mode are fourteen nozzles n2 to n15 and the nozzles used in the 6-pass mode are twelve nozzles n3 to n14.

While the printer driver in the host 200 can make an individual setting of each ejection opening to be used, the printing apparatus 100 can set ejection openings to be used only on a block-by-block basis.

Figure 6:
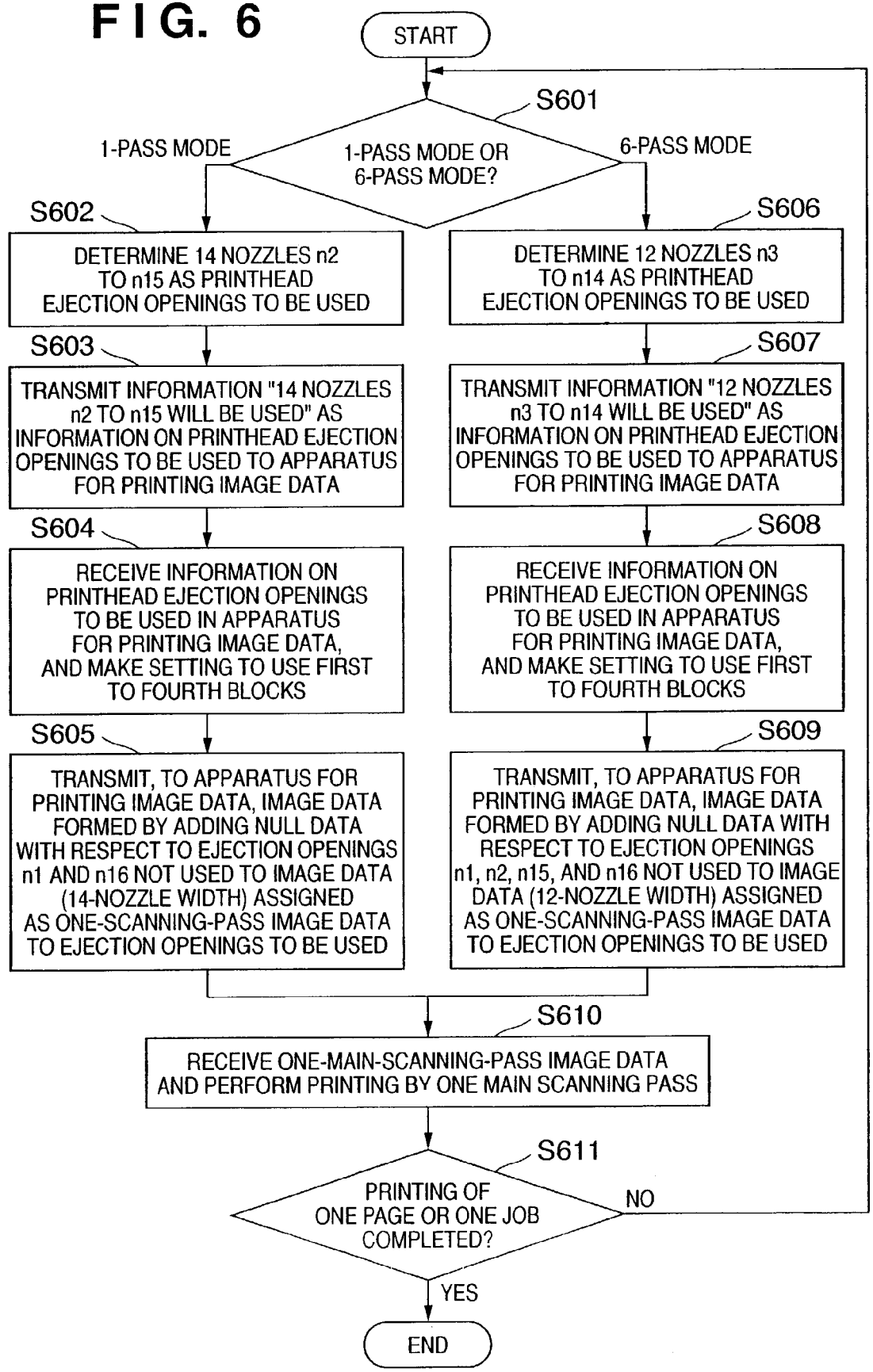
FIG. 6 is a flowchart showing processing for printing of one page or one job in the printing system in a second embodiment of the present invention.

Processing for printing of one page or one job in the printing system of this embodiment will be described with reference to the flowchart of FIG. 6.

In the host 200, the printer driver determines which one of the 1-pass mode and the 6-pass mode is set (step S601). If the printer driver in the host 200 determines that 1-pass mode is set, it makes a decision to use the fourteen nozzles n2 to n15 as the printhead ejection openings to be used (step S602).

On the basis of the printhead ejection openings to be used determined in step 602, the printer driver in the host 200 transmits to the printing apparatus 100 control data as information on the ejection openings to be used indicating that "the fourteen nozzles n2 to n15 will be used" (step S603). The printing apparatus 100 receives this control data and makes a setting to use the sixteen nozzles n1 to n16 in the first to fourth blocks shown in FIG. 4 since the starting nozzle number n2 belongs to the first block and the end nozzle number n15 belongs to the fourth block (step S604).

In this embodiment, the printing apparatus 100 makes a setting to use the nozzles in the first to fourth blocks by recognizing that the starting nozzle number n2 belongs to the first block and the end nozzle number n15 belongs to the fourth block from the starting nozzle number and the end nozzle number in the information on the ejection openings to be used transmitted by the printer driver in the host 200. However, if the printer driver previously knows that the setting is made on the block-by-block basis in the printing apparatus 100, it may transmit data indicating that the first to fourth blocks are used, as control data to be transmitted to the printing apparatus.

The printer driver in the host 200 transmits to the printing apparatus 100 image data of a size: (16 nozzles)×(the printing width of the printing medium) which is formed as image data to be printed by one main scanning pass by adding null data with respect to the two nozzles n1 and n16 not used to image data related to the fourteen nozzles which are the number of printhead ejection openings to be used (step S605). The printing apparatus 100 receives the image data transmitted to be printed by one main scanning pass, stores this data in the printing buffer, and performs printing by one main scanning pass using the first to fourth blocks as the printhead ejection openings to be used according to the setting (step S610).

The printing apparatus 100 has already set in step S604 the nozzles to be used for printing. That is, the size in the subscanning direction necessary for storage of the image data in the printing buffer has been determined and addressing at the time of write or read to or from the buffer can therefore be performed with efficiency.

In the printing apparatus 100, printing is performed by using the sixteen nozzles. However, data related to the fourteen nozzles is actually printed since null data is added in correspondence with the nozzles n1 and n16 to the image data transmitted from the printer driver in the host.

The printer driver in the host 200 determines whether printing of the whole of one page or one job has been completed (step S611). If printing of the page or job has been completed, the printer driver transmits control data signifying the completion of printing to the printing apparatus 100, and stops printing. If printing has not been completed, the printer driver transports the printing medium by 14/600 inch, the process then returns to step S601, and the printer driver again determines whether the present printing mode is the 1-pass mode or the 6-pass mode.

If the printer driver in the host 200 determines that the 6-pass mode is set in the determination of the printing mode in step S601, it makes a decision to use the twelve nozzles n3 to n14 as the printhead ejection openings to be used (step S606).

On the basis of the printhead ejection openings to be used determined in step S606, the printer driver in the host 200 transmits to the printing apparatus 100 control data as information on the ejection openings to be used indicating that "the twelve nozzles n3 to n14 will be used" (step S607). The printing apparatus 100 receives this control data and makes a setting to use the sixteen nozzles n1 to n16 in the first to fourth blocks shown in FIG. 4 since the starting nozzle number n3 belongs to the first block and the end nozzle number n14 belongs to the fourth block (step S608).

In this embodiment, the printing apparatus 100 makes a setting to use the nozzles in the first to fourth blocks by recognizing that the starting nozzle number n3 belongs to the first block and the end nozzle number n14 belongs to the fourth block from the starting nozzle number and the end nozzle number in the information on the ejection openings to be used transmitted by the printer driver in the host 200. However, if the printer driver previously knows that the setting is made on the block-by-block basis in the printing apparatus 100, it may transmit data indicating that the first to fourth blocks are used, as control data to be transmitted to the printing apparatus.

The printer driver in the host 200 transmits to the printing apparatus 100 image data of a size: (16 nozzles)×(the printing width of the printing medium) which is formed as image data to be printed by one main scanning pass by adding null data with respect to nozzles n1, n2, n15, and n16 not used to image data related to the twelve nozzles which are the number of printhead ejection openings to be used (step S609). The printing apparatus 100 receives the image data transmitted to be printed by one main scanning pass, stores this data in the printing buffer, and performs printing by one main scanning pass using the first to fourth blocks as the printhead ejection openings to be used according to the setting (step S610).

In the printing apparatus 100, printing is performed by using the sixteen nozzles. However, data related to the twelve nozzles is actually printed since null data is added with respect to the nozzles n1, n2, n15, and n16 to the image data transmitted from the printer driver in the host.

The printer driver in the host 200 determines whether printing of the whole of one page or one job has been completed (step S611). If printing of the page or job has been completed, the printer driver transmits control data signifying the completion of printing to the printing apparatus 100, and stops printing. If printing has not been completed, the printer driver transports the printing medium by 2/600 inch, the process then returns to step S601, and the printer driver again determines whether the present printing mode is the 1-pass mode or the 6-pass mode.

In this embodiment, as described above, the number of ejection openings of the printhead to be used in one main scanning pass is determined in the host according to the printing mode, and the information on the number of ejection openings to be used, image data to be printed by one main scanning pass according to the number of ejection openings to be used, and null data added to the image data with respect to the ejection openings not actually used for printing because of block-by-block setting of the ejection openings to be used in the printing apparatus are transmitted to the printing apparatus. The printing apparatus may only set the ejection openings to be used according to the received information on the number of ejection openings to be used, without recognizing the printing mode, and thereafter print received image data, thus forming an image according to the set printing mode.

It is, therefore, possible to simplify the control according to the printing mode and setting on the printing apparatus side to effectively reduce the capacity for a program to be stored in the ROM. As a result, the capacity of the ROM provided in the printing apparatus can be effectively reduced to achieve a reduction in the manufacturing cost of the printing apparatus.

Since not one but four of the ejection openings of the printhead to be used are set as a unit, the number of gates of the logic circuit, e.g., an ASIC can also be reduced effectively.

Processing performed in this embodiment also necessitates an increase in the load on the printer driver in the host and an increase in the capacity for the printer driver program. In recent years, however, the processing speed of computers ordinarily used as the above-described host and the capacity of storage devices (semiconductor memories and hard disks) used for the computers have been remarkably improved. Therefore there is no problem with the above-mentioned increases in load and program capacity.

Third Embodiment

A third embodiment of the present invention will be described. The printing system of the third embodiment is similar to those of the first and second embodiments described above. This embodiment will be described mainly with respect to its characteristic portions but the description for portions identical or corresponding to those in the first or second embodiment will not be repeated.

In the first and second embodiments, only one array of ejection openings is formed in the printhead of the printing apparatus. In the third embodiment, a plurality of arrays of ejection openings are formed in the printhead of the printing apparatus.

Figure 7:
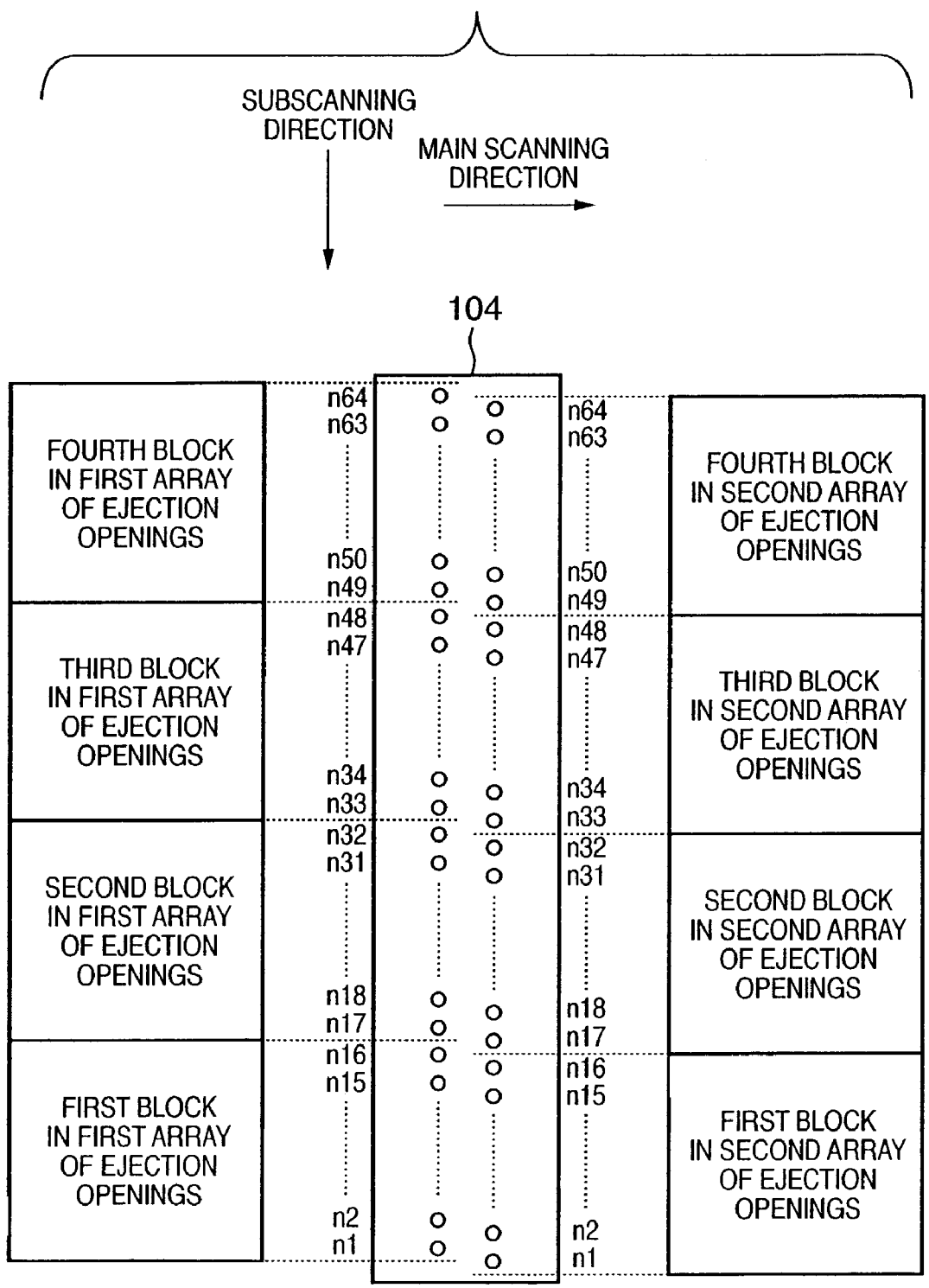
FIG. 7 is a diagram for explaining setting of ejection openings to be used in a third embodiment of the present invention.

FIG. 7 is a diagram showing setting of arrays of ejection openings in the printhead and the ejection openings to be used in this embodiment. The printhead 104 shown in FIG. 7 is a printhead for ejecting black ink and has two arrays of n=64 number of ejection openings (sixty nozzles) with a 1/300 inch pitch (a density of 300 openings per inch). These two arrays are positioned in a state of being offset by 1/600 inch in the subscanning direction. The left array as viewed in the figure will be referred to as the first array of ejection openings, and the right array will be referred as the second array of ejection openings. The printhead is driven at a drive frequency of 15 kHz and is capable of printing at a density of 600 dpi in the main scanning direction. Accordingly, the main scanning speed of the carriage in printing operation is 25 inches/sec.

The printhead ejection openings to be used can be set on a block-by-block basis with respect to each tow of ejection openings, and one block is formed by sixteen nozzles. In each array of ejection openings, sixteen nozzles n1 to n16 can be set as a first block, sixteen nozzles n17 to n32 as a second block, sixteen nozzles n33 to n48 as a third block, and sixteen nozzles n49 to n64 as a fourth block.

The printing apparatus in this embodiment uses the thus-constructed printhead to perform two-pass bidirectional printing by main scanning in the direction of arrow Q1 using the first array of ejection openings with respect to each printing area (forward printing mode) and by main scanning in the direction of arrow Q2 using the second array of ejection openings (backward printing mode). The number of ejection openings actually used in each of the forward printing mode and the backward printing mode is 62, and the two ejection openings n1 and n64 are not used for printing.

According to this setting of the groups of printhead ejection openings to be used, image data to be printed by scanning in one pass in the main scanning direction is transmitted from the printer driver in the host. The printing apparatus stores the received image data in a printing buffer according to the printing mode. From image data stored in the printing buffer, a rectangular image is formed which has a height in the subscanning direction corresponding to the number of ejection openings used and a length in the main scanning direction corresponding to the printing width of the printing medium.

Figure 8:
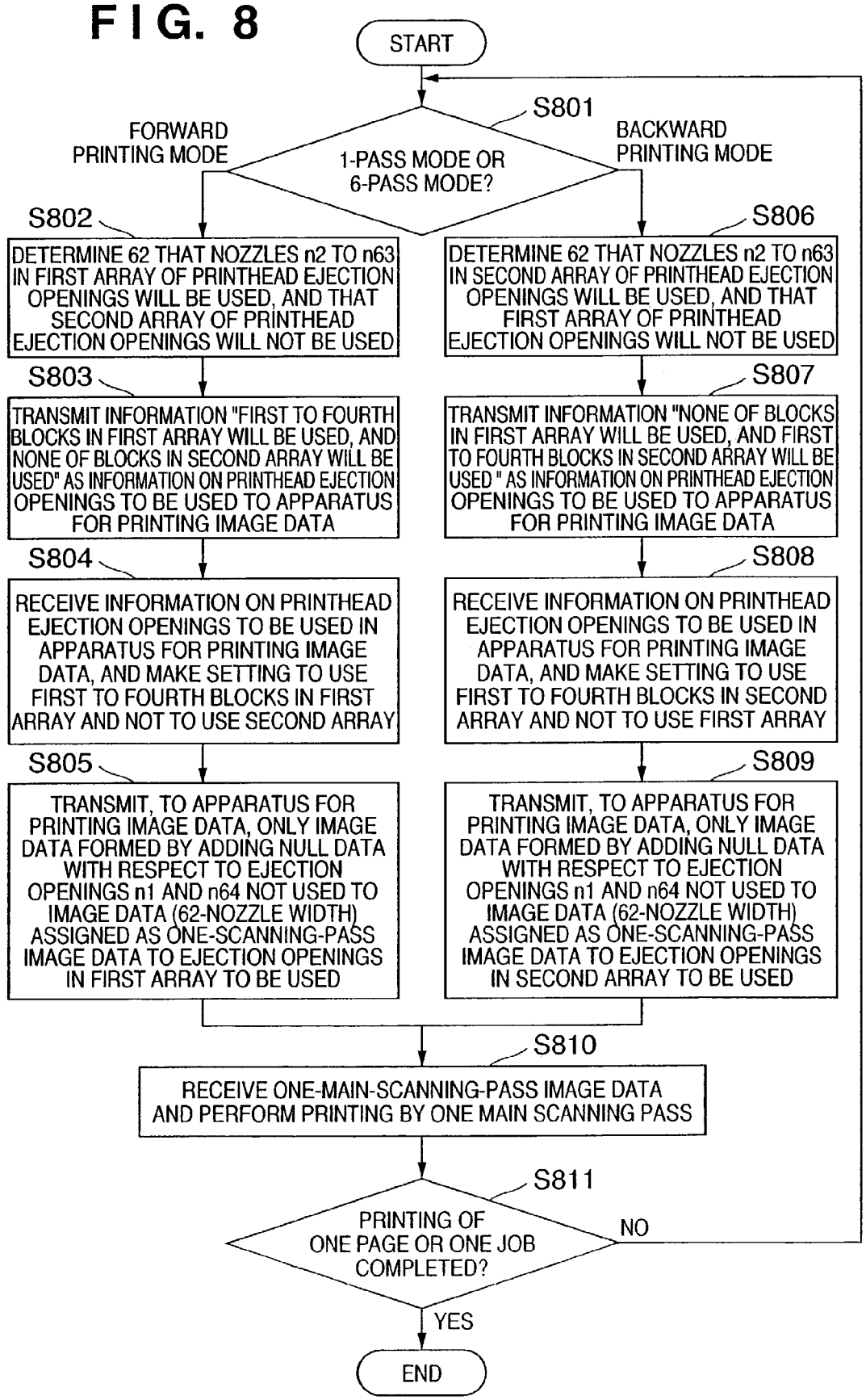
FIG. 8 is a flowchart showing processing for printing of one page or one job in the printing system in the third embodiment of the present invention.

Processing for printing of one page or one job in the printing system of this embodiment will be described with reference to the flowchart of FIG. 8.

In the host 200, the printer driver determines which one of the forward printing mode and the backward printing mode is set (step S801). If the printer driver in the host 200 determines that forward printing mode is set, it makes a decision to use the sixty-two nozzles n2 to n63 in the first array of ejection openings as the printhead ejection openings to be used and not not to use the second array of ejection openings (step S802).

On the basis of the printhead ejection openings to be used determined in step S802, the printer driver in the host 200 transmits to the printing apparatus 100 control data as information on the ejection openings to be used indicating that "the first to fourth blocks of the first array of ejection openings will be used and no blocks of the second array of ejection openings will be used" (step S803). The printing apparatus receives this control data and makes a setting to use the first to fourth blocks of the first array of ejection openings illustrated in FIG. 7 and not to use the second array of ejection openings (step S804).

The printer driver in the host 200 transmits to the printing apparatus 100 image data of a size: (64 nozzles)×(the printing width of the printing medium) which is formed as image data to be printed by one main scanning pass by adding null data with respect to the two nozzles n1 and n64 not used to image data related to the sixty-two nozzles which are the number of printhead ejection openings to be used (step S805). The printing apparatus 100 receives the image data transmitted to be printed by one main scanning pass, stores this data in the printing buffer, and performs printing by one main scanning pass using the first to fourth blocks of the first array of ejection openings of the printhead set as the ejection openings to be used (step S810).

The printing apparatus 100 has already set in step S804 the nozzles to be used for printing. That is, the size in the subscanning direction necessary for storage of the image data in the printing buffer has been determined and addressing at the time of write or read to or from the buffer can therefore be performed with efficiency.

In the printing apparatus 100, printing is performed by using the sixty-four nozzles. However, data related to the sixty-two nozzles is actually printed since null data is added in correspondence with the nozzles n1 and n64 to the image data transmitted from the printer driver in the host. That is, the image data is printed at 300 dpi by using the sixty-two nozzles in the first array of ejection openings in the total number of ejection openings in the first and second arrays of ejection openings, i.e., 128 nozzles with the 600 dpi pitch.

The printer driver in the host 200 determines whether printing of the whole of one page or one job has been completed (step S811). If printing of the page or job has been completed, the printer driver transmits control data signifying the completion of printing to the printing apparatus 100, and stops printing. If printing has not been completed, the process returns to step S801 and the printer driver again determines whether the forward printing mode or the backward printing mode is set. Ordinarily, printing is not completed at this stage and transport of the printing medium is not performed, since only printing by the going path has been performed.

If the printer driver in the host 200 determines that the backward printing mode is set in the determination of the printing mode in step S801, it makes a decision to use the sixty-two nozzles n2 to n63 in the second array of ejection openings as the printhead ejection openings to be used and not to use the first array of ejection openings (step S806).

On the basis of the printhead ejection openings to be used determined in step S806, the printer driver in the host 200 transmits to the printing apparatus 100 control data as information on the ejection openings to be used indicating that "the first to fourth blocks of the second array of ejection openings will be used and no blocks of the first array of ejection openings will be used" (step S807). The printing apparatus 100 receives this control data and makes a setting to use the first to fourth blocks of the second array of ejection openings and not to use the first array of ejection openings (step S808).

The printer driver in the host 200 transmits to the printing apparatus 100 image data of a size: (64 nozzles)×(the printing width of the printing medium) which is formed as image data to be printed by one main scanning pass by adding null data with respect to the two nozzles n1 and n64 not used to image data related to the sixty-two nozzles which are the number of printhead ejection openings to be used (step S809). The printing apparatus 100 receives the image data transmitted to be printed by one main scanning pass, stores this data in the printing buffer, and performs printing by one main scanning pass using the first to fourth blocks of the second array of ejection openings of the printhead set as the ejection openings to be used (step S810).

At this time, printing is performed by using the sixty-four nozzles in the printing apparatus 100. However, data related to the sixty-two nozzles is actually printed since null data is added in correspondence with the nozzles n1 and n64 to the image data transmitted from the printer driver in the host. That is, the image data is printed at 300 dpi by using the sixty-two nozzles in the second array of ejection openings in the total number of ejection openings in the first and second arrays of ejection openings, i.e., 128 nozzles with the 600 dpi pitch.

The printer driver in the host 200 determines whether printing of the whole of one page or one job has been completed (step S811). If printing of the page or job has been completed, the printer driver transmits control data signifying the completion of printing to the printing apparatus 100, and stops printing. If printing has not been completed, the printer driver transports the printing medium by $^{62}/_{300}$ inch, the process then returns to step S801, and the printer driver again determines whether the forward printing mode or the backward printing mode is set.

In this embodiment, as described above, the array of ejection openings to be used and the ejection openings to be used in the printhead are determined in the host according to the printing direction with respect to each main scanning pass, and the information on the array of ejection openings and the ejection openings to be used and image data to be printed by one main scanning pass according to the setting of the ejection openings to be used on the printing apparatus side are transmitted to the printing apparatus. At this time, if some ejection opening not actually used for printing is included in the setting of the ejection openings to be used on the printing apparatus side, the printer driver adds null data to the image data in correspondence with the ejection opening not used for printing. The printing apparatus may only set the ejection openings to be used according to the received information on the number of ejection openings to be used, without recognizing the printing mode, regardless of the forward printing/backward printing mode and thereafter print received image data, thus, forming an image according to the set printing direction.

It is, therefore, possible to simplify the control according to the printing mode and setting on the printing apparatus side to effectively reduce the capacity for a program to be stored in the ROM. As a result, the capacity of the ROM provided in the printing apparatus can be effectively reduced to achieve a reduction in the manufacturing cost of the printing apparatus.

Since not one but sixteen of the ejection openings of the printhead to be used are set as a unit in the printing apparatus, the number of gates of the logic circuit, e.g., an ASIC can also be reduced effectively.

Processing performed in this embodiment also necessitates an increase in the load on the printer driver in the host and an increase in the capacity for the printer driver program. In recent years, however, the processing speed of computers ordinarily used as the above-described host and the capacity of storage devices (semiconductor memories and hard disks) used for the computers have been remarkably improved. Therefore there is no problem with the above-mentioned increases in load and program capacity.

In this embodiment, the printhead has two arrays of ejection openings. However, the number of arrays of ejection openings is not limited to this, and three or more arrays of ejection openings may be provided. Further, while the arrays of ejection openings are horizontally arranged in a side-by-side fashion in this embodiment, some arrays of ejection openings may be vertically arranged in series.

OTHER EMBODIMENTS

Four of the ejection openings of the printhead to be used are set as a unit in the printing apparatus in the first and second embodiments, and sixteen of the ejection openings to be used are set as a unit in the printing apparatus in the third embodiment. However, the set unit of ejection openings to be used is not limited to these units. The unit number of ejection openings may be an integer larger equal to or larger than 2. If the unit number of ejection openings is some power of 2, the effect of reducing the number of gates of the logic circuit, e.g., an ASIC can be further improved.

The information on the printhead ejection openings to be used transmitted from the printer driver to the printing apparatus may be either of the form used in the first and second embodiments, i.e., the form having the starting nozzle number, the end nozzle number and the number of nozzles, and the form used in the third embodiment, i.e., the form having the starting block number and the number of blocks with respect to each of arrays of ejection openings. Further, a form other than these may alternatively be used if it enables identification of part of nozzles to be used. For example, if the same setting is made with respect to arrays of ejection openings, the individual setting with respect to each array of ejection openings may be omitted and a form having the starting nozzle number of the end nozzle number and the number of nozzles may suffice.

Each of the embodiments of the present invention has been described with respect to an example of a printing system including a printing apparatus for performing monochromic printing using only a printhead for ejecting black ink. However, the present invention can also be applied to a printing system including a printing apparatus having a plurality of arrays or ejection openings or a plurality of printheads which respectively eject color inks such as cyan, magenta and yellow inks. In such a case, information for discrimination of kinds of ink used may be provided and the number of arrays of ejection openings, the number of ejection openings and the placement of ejection openings may be selected with respect to inks.

Each of the embodiments of the present invention has been described above with respect to an example of a case where the printhead ejection openings to be used are selected according to the pass number or the printing direction. However, the number of ejection openings to be used may be changed according to some of other printing parameters such as the kind of printing medium, the size of the printing medium, the printing resolution and the amount of data per pixel. Also, the printhead ejection openings to be used may be changed not with respect to each main scanning pass but with respect to each of unit groups of a certain number of main scanning passes, each of pages, or each of jobs.

While the embodiments of the present invention have been described with respect to an example of an ink jet printing apparatus, the present invention can also be applied to printing apparatuses using other printing methods other than ink jet printing if the printing apparatuses are serial printing apparatus in which a printing medium is scanned with a printhead to perform printing.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy. According to this ink-jet printer and printing method, a high-density, high-precision printing operation can be attained.

As the typical arrangement and principle of the ink-jet printing system, those practiced by use of the basic principle disclosed in, for example, U.S. Pat. Nos. 4,723,129 and 4,740,796 is preferable. The above system is applicable to either one of so-called on-demand type and continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal.

By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note further that excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention.

In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

The present invention can be applied to a system comprising a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention also includes a case where an OS (operating system) or the like working on the computer performs parts or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

If the present invention is realized as a storage medium, program codes corresponding to the above mentioned flowcharts (FIG. 5, 6 and/or FIG. 8) are to be stored in the storage medium.

As is apparent, many different embodiments of the present invention can be made without departing from the spirit and scope thereof, so it is to be understood that the invention is not limited to the specific embodiments thereof except as defined in the appended claims.

What is claimed is:

1. A printing system comprising:
a printing apparatus using a printhead having an array of printing elements in which a plurality of printing elements are arranged in a predetermined direction, said printing apparatus performing printing by scanning the printhead over a printing medium in a main scanning direction crossing the predetermined direction, said printing apparatus being capable of printing on a printing area of a printing medium by either a first mode in which the printing on the printing area is completed by a single scan of the printhead or a second mode in which the printing on the printing area is completed by multiple scans of the printhead; and
a host apparatus connected to said printing apparatus, said host apparatus transmitting control information and image data each time the printhead scans,
wherein said host apparatus transmits, as the control information, setting information designating some printing elements to be used for printing in the printing elements of said printhead corresponding to a printing mode determined by selecting the first or second mode, and transmits the image data of an amount corresponding to a number of printing elements used by one scanning printing, and
wherein said printing apparatus has setting means for setting the printing elements to be used according to the setting information, and performs printing by driving the printing elements set by said setting means according to the image data in the scanning printing.

2. The printing system according to claim 1, wherein said printing apparatus sets a unit group of a certain number of printing elements as the printing elements to be used, and
said host apparatus generates the image data by adding null data in correspondence with some printing element not used for printing in the printing elements set in said printing apparatus.

3. The printing system according to claim 2, wherein the certain number is a power of 2.

4. The printing system according to claim 1, wherein the setting information includes area designation information enabling a plurality of consecutive printing elements to be identified as the printing elements to be used for printing.

5. The printing system according to claim 1, wherein said printhead has a plurality of arrays of printing elements, and the setting information includes information designating one of the arrays of printing elements to be used for printing.

6. The printing system according to claim 1, wherein said printing apparatus has a plurality of said printheads for enabling color printing using a plurality of printing agents, and said host apparatus transmits the setting information and the image data to each of the printheads.

7. The printing system according to claim 1, wherein said printhead is an ink jet printhead which ejects ink to perform printing.

8. The printing system according to claim 7, wherein said printhead is a printhead which ejects ink by using thermal energy, and which has thermal energy conversion elements for generating thermal energy to be applied to ink.

9. A printer driver installed in a host apparatus connected to a printing apparatus using a printhead having an array of printing elements in which a plurality of printing elements are arranged in a predetermined direction, said printing apparatus scanning the printhead over a printing medium in a main scanning direction crossing the predetermined direction, the printing apparatus being capable of printing on a printing area of a printing medium by either a first mode in which the printing on the printing area is completed by a single scan of the printhead or a second mode in which the printing on the printing area is completed by multiple scans of the printhead, said printer driver transmitting control information and image data to the printing apparatus each time the printhead scans, said printer driver comprising program codes for executing:
a setting information preparation step of preparing setting information designating, corresponding to a printing mode determined by selecting the first or second mode, some printing elements to be used for printing in the printing elements of the printhead set by the printing apparatus;

a control information transmission step of transmitting the setting information as the control information;

an image data generation step of generating the image data of an amount corresponding to a number of printing elements used by one scanning printing; and an image data transmission step of transmitting the image data.

10. A storage medium on which the printer driver according to claim 9 is stored.

11. A printing method of performing printing in a printing apparatus capable of printing on a printing area of a printing medium by either a first mode in which the printing on the printing area is completed by a single scan of a printhead having an array of printing elements arranged in a predetermined direction or a second mode in which the printing on the printing area is completed by multiple scans of the printhead according to control information and image data transmitted from a host apparatus each time the printhead scans, said method comprising:

transmitting from the host apparatus setting information designating printing elements to be used for printing in the printing elements of the printhead corresponding to a printing mode determined by selecting the first or second mode, the setting information being transmitted as the control information;

setting the printing elements to be used according to the setting information;

generating in the host apparatus the image data of an amount corresponding to a number of printing elements used by one scanning printing, and transmitting the image data; and performing printing by driving the printing elements set by said setting means according to the image data in the scanning printing.

12. The printing system according to claim 1, wherein said host apparatus determines the printing mode to be executed each time said host apparatus transmits the control information and the image data.

13. The printing system according to claim 1, wherein said printing apparatus comprises a printing buffer which stores the image data transmitted from said host apparatus, and accesses the printing buffer according to the setting information.

14. The printing system according to claim 1, wherein said printing apparatus comprises a setting unit which sets printing elements to be used for printing according to the setting information in units of multiple printing elements.

15. The printing system according to claim 1, wherein said host apparatus transmits the control information before transmitting the image data of an amount corresponding to a number of printing elements used by one scanning printing.

* * * * *

UNITED STATES PATENT AND TRADEMARK OFFICE
CERTIFICATE OF CORRECTION

PATENT NO. : 7,315,393 B2 Page 1 of 1
APPLICATION NO. : 10/411298
DATED : January 1, 2008
INVENTOR(S) : Kanda et al.

It is certified that error appears in the above-identified patent and that said Letters Patent is hereby corrected as shown below:

COLUMN 3:
Line 53, "printing" should read --the printing--.

COLUMN 6:
Line 46, "data-stored" should read --data stored--.

COLUMN 8:
Line 49, "set" should read --set in--.

COLUMN 11:
Line 56, "tow" should read --row--.

COLUMN 12:
Line 21, "printer." should read --printer--.

COLUMN 14:
Line 50, "larger" should be deleted.
Line 62, "arrays" should read --the arrays--.

COLUMN 17:
Line 42, "above mentioned" should read --above-mentioned--.

Signed and Sealed this

Twenty-fourth Day of February, 2009

JOHN DOLL
*Acting Director of the United States Patent and Trademark Office*